(12) United States Patent
Tsumura

(10) Patent No.: US 6,553,056 B1
(45) Date of Patent: Apr. 22, 2003

(54) CDMA RECEIVER WITH A REDUCED NUMBER OF REQUIRED HIGH SPEED ADDERS

(75) Inventor: Soichi Tsumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/310,871

(22) Filed: May 12, 1999

(30) Foreign Application Priority Data

May 12, 1998 (JP) .......................................... 10-129074

(51) Int. Cl.$^7$ ................................................ H04B 1/69
(52) U.S. Cl. ..................... 375/130; 375/141; 375/142; 375/147; 375/150; 370/335; 370/441
(58) Field of Search ................................. 375/130, 141, 375/142, 147, 150, 152; 370/208, 335, 252, 342, 441

(56) References Cited

U.S. PATENT DOCUMENTS

| | | | |
|---|---|---|---|
| 5,734,639 A | * | 3/1998 | Bustamante et al. ........ 370/208 |
| 6,137,825 A | * | 10/2000 | Sekine et al. ................ 375/130 |
| 6,229,843 B1 | * | 5/2001 | Lomp et al. ................. 375/150 |
| 6,292,477 B1 | * | 9/2001 | Ohgoshi et al. ............. 370/335 |

FOREIGN PATENT DOCUMENTS

| JP | 8-509343 | 10/1996 |
|---|---|---|
| JP | 9-8770 | 1/1997 |

* cited by examiner

*Primary Examiner*—Shuwang Liu
(74) *Attorney, Agent, or Firm*—Dickstein, Shapiro, Morin & Oshinsky, LLP.

(57) ABSTRACT

A CDMA receiver with a reduced number of high speed adders is provided, wherein integration for one symbol period is performed for each value of spreading code corresponding to a particular user signal by the use of a high speed adder, first and second switches, and a register group. The integrated values are stored in respective first registers of the register group and then despread in accordance with respective spreading codes. As a result, an adder with a slow operational speed can be employed as a first slow speed adder that adds the values from first multipliers, and a second slow speed adder for addition of the values of the first registers. Therefore, a common pilot signal and a user signal can be despread with only one high speed adder.

8 Claims, 3 Drawing Sheets

CDMA RECEIVER WITH A REDUCED NUMBER OF REQUIRED HIGH SPEED ADDERS

BACKGROUND OF THE INVENTION

1. Field of the Invention

The present invention generally relates to a CDMA (Code Division Multiple Access) communication system, and more particularly to a CDMA receiver thereof.

2. Description of the Related Art

A CDMA communication system refers to a communication system in which a transmitter spreads a user signal to be transmitted with a spreading code and then transmits the signal, while a receiver despreads the received signal with a spreading code which is a complex conjugate number of the spreading code to obtain the original user signal. The user signal to be transmitted as information is hereinafter referred to as a symbol and a transmission speed of the user signal is hereinafter referred to as a symbol rate. A chip rate, which is a transmission speed of the spreading code for spreading the symbol, is typically several tens to several hundreds times higher than the symbol rate. A chip is a unit of data constituting the spreading code.

In the CDMA communication system, a plurality of transmitters perform spread with differing spreading codes each having orthogonality, and a receiver selects a spreading code for use in despread to be able to specify a signal from a transmitter with a channel established therebetween, thus making it possible to use the same frequency band for a plurality of channels.

In the communication system, since the receiver is unable to despread the received data unless it detects synchronization of it. Thus, the transmitter always transmits a pilot channel for the detection of the synchronization independently of a channel for the transmission of the user signal. The receiver detects the synchronization with the pilot channel to perform synchronous detection for other channel.

Next, the construction of such a prior art CDMA communication system will be described by way of example with reference to FIGS. 1 and 2. The prior art CDMA communication system comprises a CDMA transmitter and a CDMA receiver. FIG. 1 illustrates in block form a configuration of the CDMA transmitter, and FIG. 2 illustrates in block form a configuration of the CDMA receiver.

The CDMA transmitter in FIG. 1 transmits a user signal to a plurality of CDMA receivers over a signal frequency band, and comprises multipliers 11, $12_0$ to $12_n$, and 15, an adder 14, and a transmission unit (TX RF) 16.

Multiplier 11 multiplies common pilot signal (P) 101 by spreading code $C_P$. Multipliers $12_0$ to $12_n$ multiply user signals ($D_0$ to $D_n$) $102_0$ to $102_n$ by spreading codes $C_{D0}$ to $C_{Dn}$. Each of these spreading codes $C_P$ and $C_{D0}$ to $C_{Dn}$ is a spreading code of a so-called short code. Adder 14 adds output signals from multiplier 11 and $12_0$ to $12_n$ together to perform code division multiplexing.

Multiplier 15 multiplies an output signal from adder 14 by spreading code $C_L$ to convert the output signal from adder 14 to a spread signal. The spreading code $C_L$ is a spreading code of a so-called long code. Transmission unit (TX RF) 16 modulates the spread signal generated by multiplier 15 and then amplifies the modulated signal for conversion to transmission signal 107.

In this means, the transmitter spreads n+1 user signals ($D_0$ to $D_n$) $102_0$ to $102_n$ to be transmitted with different spreading codes $C_{D0}$ to $C_{Dn}$ respectively for transmission.

As shown in FIG. 2, the CDMA receiver comprises a reception unit (RX RF) 21, multipliers 22, 51 and 61, high speed adders 52 and 62, and registers 53 and 63.

Reception unit (RX RF) 21 demodulates received signal 201. Multiplier 22 multiplies the signal demodulated by reception unit 21 by $C_L^*$ which is complex conjugate number of spreading code $C_L$ for despread. Multiplier 51 multiplies the signal despread by multiplier 22 by $C_P^*$ which is complex conjugate number of spreading code $C_P$.

Multiplier 61 multiplies the signal despread by multiplier 22 by $C_{Di}^*$ which is complex conjugate number of spreading code $C_{Di}$ (i=0 to n) assigned to each of user signals $102_0$ to $102_n$. For example, in the CDMA receiver for receiving user signal $D_2$, the signal despread by multiplier 22 is multiplied by spreading code $C_{D2}^*$ at multiplier 61.

Register 53 stores output signals from high speed adder 52 for one chip and then outputs the signals. High speed adder 52 adds an output signal from multiplier 51 to the output signal from register 53. In this means, high speed adder 52 and register 53 accumulate the output signal from multiplier 51 for one symbol period to thereby generate despread pilot signal 205.

Register 63 stores output signals from high speed adder 62 for one chip and then outputs the signals. High speed adder 62 adds an output signal from multiplier 61 to the output signal from register 63. In this means, high speed adder 62 and register 63 accumulate the output signal from multiplier 61 for one symbol period to thereby generate despread user signal 204.

Both registers 53 and 63 are designed to be cleared by a signal (not shown), after the completion of the accumulation of the signal for one symbol period of time.

The prior art CDMA receiver is intended for receiving only one of a plurality of channels transmitted, and therefore only one set of multiplier 61, high speed adder 62, and register 63 is shown in FIG. 2. However, the provision of a plurality of sets of these circuits enables a plurality of channels to be simultaneously received.

In the prior art CDAM receiver, since the data despread by multiplier 51 and the data despread by multiplier 61 both operate at a chip rate, a high speed adder capable of processing the signal at the chip rate is required to perform integration for these data for one symbol period in real time. To this end, the prior art CDMA receiver utilizes high speed adders 52 and 62 that consume a larger amount of power than a slow speed adder. This prior art CDMA receiver must use two high speed adders with a high power consumption.

However, when the CDMA communication system is applied to a mobile communication system, an increased power consumption will cause decrease in operating time because a mobile communication terminal operates with a power supply such as a battery. In particular, since the mobile communication terminal has been become increasingly smaller in recent years and a less capacity is available for a battery mounted in the mobile communication terminal, increase in the power consumption is a serious problem.

SUMMARY OF THE INVENTION

It is an object of the present invention to provide a CDMA receiver with a reduced number of required high speed adders and therefore has a less amount of power consumption.

To achieve the above-mentioned object, the CDMA receiver according to the present invention comprises a high speed adder, a register group, first and second code generating means, first and second switches, first and second multipliers, and first and second slow speed adders.

The high speed adder adds a signal obtained by demodulating a received signal to a first accumulated value. The register group comprises as many first registers as the number of values that by a spreading code of a user signal may take on. Each of the registers of the group is reset for one symbol period. The first code generating means sequentially and repetitively generates a spreading code corresponding to a particular user signal.

The first switch receives a signal from the high speed adder and supplies the signal to one of first registers corresponding to a value being applied thereto from the first code generating means. The second switch selects a value stored in the one of the first registers corresponding to the value of the spreading code being applied thereto from the first code generating means to output the value as a first accumulated value.

The number of the first multipliers is equal to the number of the first registers included in the register group. Each of the first multipliers multiplies each value stored in one of the first registers by the value of the complex conjugate number of the value of the spreading code corresponding to a particular user signal associated with the one of the first registers. The first slow speed adder adds signals outputted from the first multipliers together. The second slow speed adder adds the values respectively stored in the first registers together. The second code generating means sequentially repeatedly generates the codes of the complex conjugate number of a spreading code corresponding to a common pilot signal. The second multiplier multiplies the added value at the second slow speed adder by the value of the code generated at the second code generating means.

In the present invention, integration for one symbol period is performed for each value of the spreading code corresponding to the particular user signal, by the use of the high speed adder, the first and second switches, and the register group, and the resultant values are once stored in the respective first registers of the register group and then despread is performed in accordance with respective spreading codes. As a result, an adder with a slow operational speed can be employed as the first slow speed adder for addition of the values from the first multipliers and the second slow speed adder for addition of the values of the first registers. Therefore, the common pilot signal and the user signal can be despread with only one high speed adder, thereby reducing an amount of power consumption.

According to an embodiment of the present invention, the CDMA receiver further includes a third slow speed adder and a second register. The third slow speed adder adds an output signal from the second multiplier to a second accumulated value. The second register stores an output signal from the third slow speed adder for one chip and then outputs the signal as the second accumulated value.

The present invention is thus applicable to a case in which even the symbol rate of the common pilot signal is not equal to the symbol rate of the user signal.

According to another embodiment of the present invention, the received signal from a transmitter is spread using QPSK (Quadrature Phase Shift Keying) and the register group includes four first registers.

The above and other objects, features and advantages of the present invention will become apparent from the following description with reference to the accompanying drawings which illustrate examples of the present invention.

DETAILED DESCRIPTION OF THE PREFERRED EMBODIMENT

Figure 1:
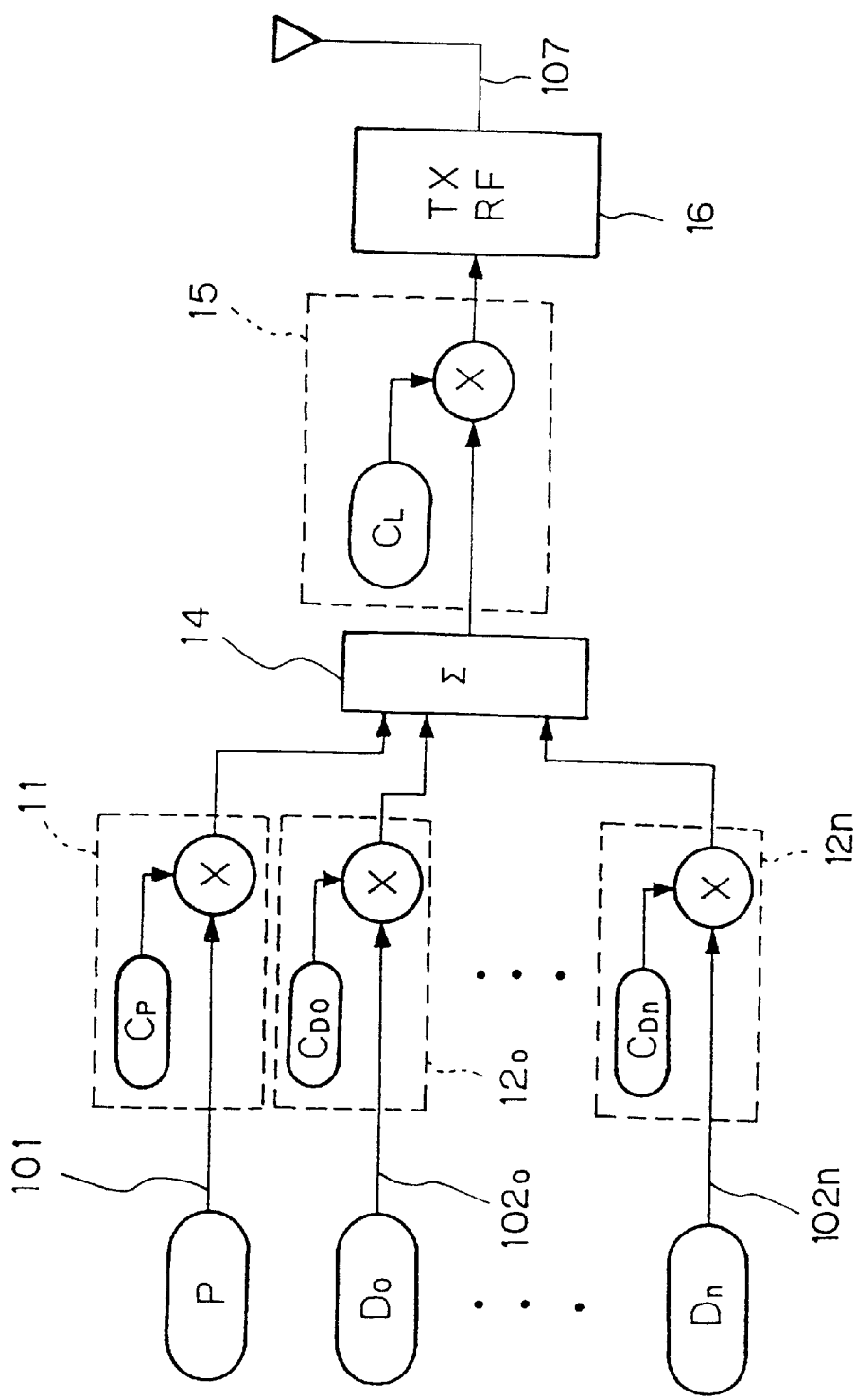
FIG. 1 is a block diagram showing a configuration of a CDMA transmitter in a prior art mobile communication system.
Figure 3:
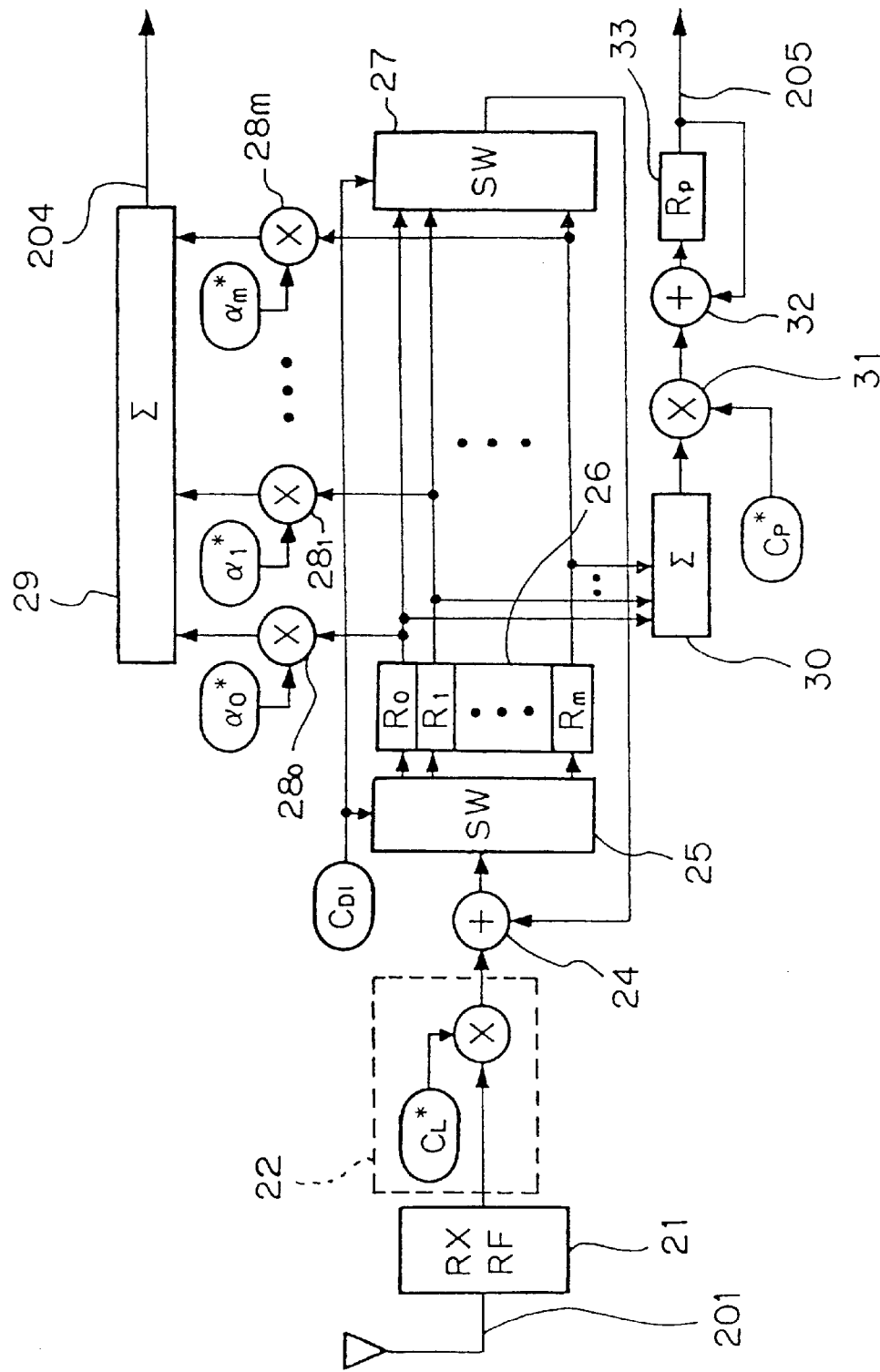
FIG. 3 is a block diagram showing a configuration of a CDMA receiver in a mobile communication system of an embodiment according to the present invention.

A CDMA communication system of an embodiment according to the present invention, comprises a CDMA transmitter shown in FIG. 1, and a CDMA receiver shown in FIG. 3.

The CDMA receiver in the embodiment comprises a reception unit 21, a multiplier 22, a high speed adder 24, a switch 25, a register group 26, a switch 27, multipliers $28_0$ to $28_m$, slow speed adders 29 and 30, a multiplier 31, a slow speed adder 32, and a register 33.

In the CDMA receiver, it is possible to know previously spreading code $C_{Di}$ corresponding to user signal $101_i$ to be received (i=0 to n) and spreading code $C_L$ corresponding to common pilot signal 101, these spreading codes being generated in sequence repeatedly. For example, in the CDMA receiver for receiving user signal $D_2$, spreading code $C_{D2}$ is applied to switches 25 and 27 from the outside.

High speed adder 24 adds a signal despread by multiplier 22 to a signal outputted from switch 27.

Register group 26 comprises m+1 registers $R_0$ to $R_m$. The values of respective registers $R_0$ to $R_m$ which are included in register group 26 are reset for each symbol period of user signal $D_i$. M+1 represents the number of values which spreading code $C_{Di}$ can take on. When the spreading using each spreading code $C_{Di}$ is performed with QPSK, that is, when states of respective codes can be represented as four states of +1, +j, −1, and −j, the number of registers in register group 26 is four. On the other hand, when the code division multiplexing using each spreading code $C_{Di}$ is performed with BPSK (Binary Phase Shift Keying), the number of registers in register group 26 is two.

Switch 25 provides a signal applied from high speed adder 24 to the register of $R_0$ to $R_m$ in register group 26 that corresponds to value $\alpha_j$ of spreading code $C_{Di}$ being applied at that time. For example, at the timing of spreading code $C_{Di}=\alpha_j$, switch 25 provides the output signal from high speed adder 24 to register $R_j$.

Switch 27 selects and outputs the signal stored in register $R_j$ of registers $R_0$ to $R_m$ in register group 26 that corresponds to the value $\alpha_j$ of spreading code $C_{Di}$ being applied at that time. Multipliers $28_0$ to $28_m$ multiply the values stored in registers $R_0$ to $R_m$ of register group 26, which are the values accumulated for user signal Di during one signal period, by the $\alpha_j^*$ which is complex conjugate number of the value $\alpha_j$ for the code corresponding to each register $R_0$ to $R_m$.

Slow speed adder 29 adds the signals outputted from multipliers $28_0$ to $28_m$ together to recover despread user signal 204.

Slow speed adder 30 adds the values respectively stored in respective registers $R_0$ to $R_m$ of register group 26 together. Multiplier 31 multiplies a signal outputted from slow speed adder 30 by $C_p^*$ which is complex conjugate number of spreading code $C_p$. Register 33 stores an output signal from slow speed adder 32 for one chip and then outputs the signal. Slow speed adder 32 adds an output signal from multiplier 31 to the output signal from register 33. Specifically, slow speed adder 32 and register 33 accumulate the output signal from multiplier 31 for one symbol period to generate despread pilot signal 205.

Next, operation of the CDMA receiver of this embodiment will be described with reference to FIG. 3.

First, reception signal 201 from a transmitter is demodulated at reception unit 21 and then is multiplied by $C_L^*$ which is complex conjugate number of spreading code $C_L$ at multiplier 22 to perform despread. The despread signal is then added to the output signal from switch 27 and then outputted to switch 25. Switch 25 outputs the signal applied from high speed adder 24 to the register of $R_0$ to $R_m$ in register group 26 that corresponds to value $\alpha_j$ of the spreading code $C_{Di}$ being applied at that time.

Performing the above-mentioned processing for one symbol permits each of registers $R_0$ to $R_m$ to store a value obtained by integrating the signal from multiplier 22 in one symbol period based on spreading code $C_{Di}$ for each value that spreading code $C_{Di}$ can take.

Let it be assumed the spreading is performed with the QPSK and the signal from high speed adder 24 is represented by the following equation (1) in one symbol period:

$$\text{"}1, 1, -1, j, -j, j\text{"} \quad (1)$$

In this case, spreading code $C_{Di}$ is assumed to be represented by the following equation (2):

$$C_{Di}=\text{"}1, 1, -1, j, -j, j\text{"} \quad (2)$$

It is also assumed that register $R_0$ corresponds to code "1", register $R_1$ associates with code "−1", register $R_2$ corresponds to code "j", and register $R_3$ associates with code "−j".

Under these assumptions, values "2", "−1", "2j", and "−j" are respectively stored in registers $R_0$ to $R_3$.

Upon completion of the accumulation for one symbol period, each of multipliers $28_0$ to $28_m$ multiplies each of the values stored in respective registers $R_0$ to $R_m$ by $\alpha_j^*$ which is complex conjugate number of value $\alpha_j$ of the code corresponding to each of registers $R_0$ to $R_m$. Conjugate complex numbers of "1", "−1", "j", and "−j" are "1", "−1", "−j", and "j", respectively.

Finally, slow speed adder 29 adds the signals from multipliers $28_0$ to $28_m$ together to recover despread user signal 204.

This operation is equivalent to a calculation as expressed in the following equation (3).

$$2 \cdot 1 + (-1) \cdot (-1) + 2j \cdot (-j) + j \cdot (-j) = 6 \quad (3)$$

In this example, due to the method of the signal for one symbol period to the value of spreading code $C_{Di}$, despread user signal 204 exhibits a large value.

Next, operation for recovering the common pilot signal will be described. In this case, slow speed adder 30 adds the values stored in respective registers $R_0$ to $R_m$ in register group 26 together and multiplier 31 multiplies the resultant value by $C_p^*$ which is complex conjugate number of spreading code $C_p$ assigned to common pilot signal 101. Slow speed adder 32 and register 33 accumulate the output signal from multiplier 31 for one symbol period to recover despread common pilot signal 205.

In the present embodiment, multiplier 22 performs despread with spreading code $C_L$, high speed adder 24, switches 25 and 27, and register group 26 perform integration for one symbol period for each of values $\alpha_0$ to $\alpha_m$ of spreading code $C_{Di}$, and the resultant values are once stored in register group 26 and then the next despread is performed.

Figure 2:
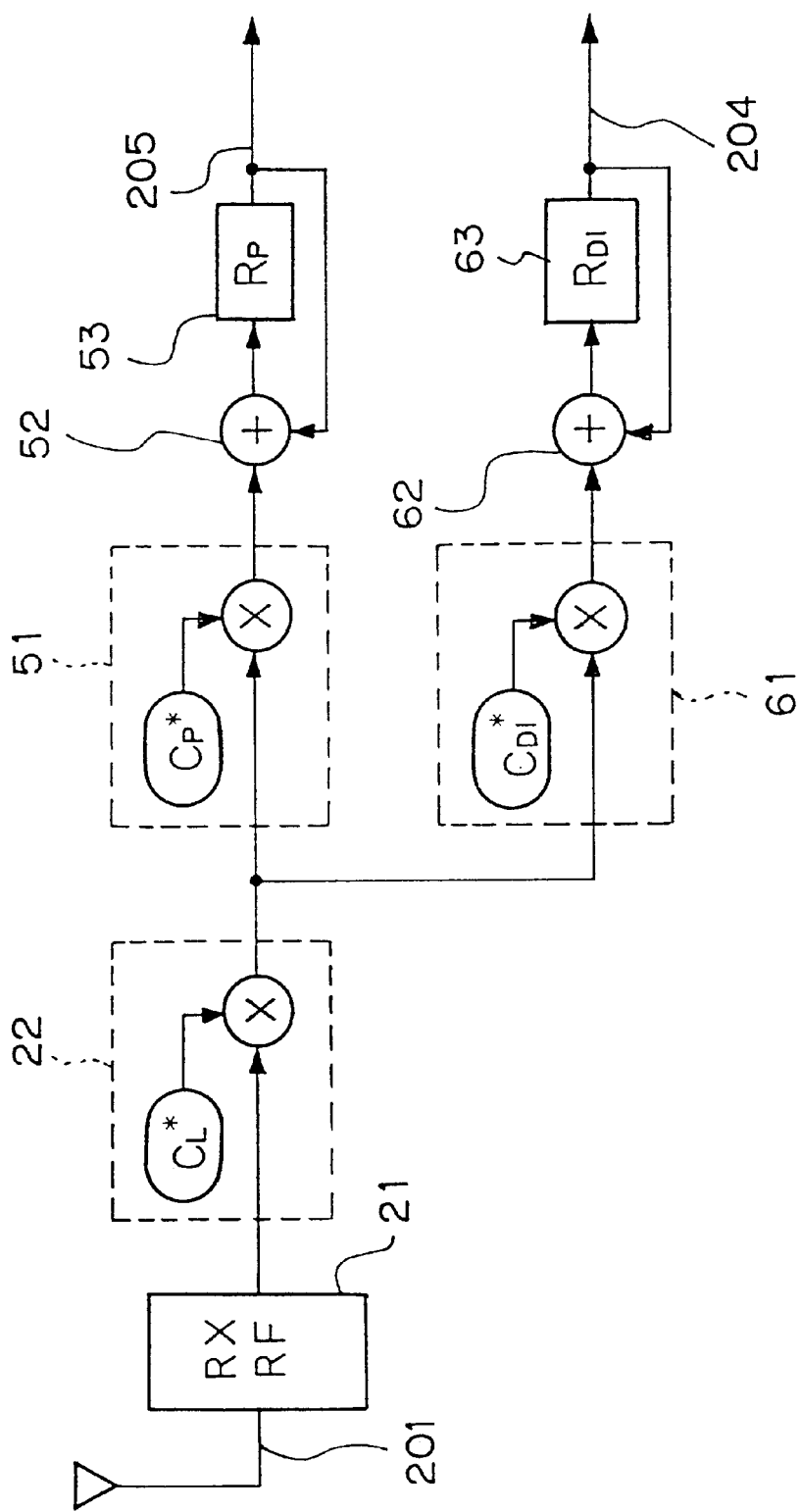
FIG. 2 is a block diagram showing a configuration of a CDMA receiver in the prior art mobile communication system.

Thus, the CDMA receiver of this embodiment can despread the common pilot signal and user signal only with one high speed adder 24 and three slow speed adders 29, 30 and 32, whereas the prior art CDMA receiver shown in FIG. 2 required two high speed adders 52 and 62 for despreading the common pilot signal and user signal.

Since the CDMA receiver of this embodiment requires only one high speed adder 24, power consumption thereof can be remarkably reduced as compared with the prior art CDMA receiver in FIG. 2 which requires two high speed adders 52 and 62.

Moreover, in the CDMA receiver according to the present embodiment, slow speed adder 32 and register 33 can be obviated if the symbol rate of common pilot signal 101 are equal to the symbol rate of user signals $102_0$ to $102_n$.

In the CDMA communication system according to the embodiment, the CDMA transmitter spreads user signals $102_0$ to $102_n$ and common pilot signal 101 with spreading codes $C_{D0}$ to $C_{Dn}$ or spreading code $C_p$, and then with spreading code $C_L$ and transmits the signal. However, the present invention is not limited to a case in which signals to be transmitted are subjected to the double spread. Thus, the transmitter may transmit the signal without spread with spreading code $C_L$ and the receiver may not despread the signal with $C_L^*$.

Furthermore, in the present embodiment, the values of respective spreading codes can be represented by the four states of +1, +j, −1, and −j when the spreading by each spreading code $C_{Di}$ is performed with the QPSK modulation. Since the conjugate complex numbers of +1, +j, −1, and −j are +1, −j, −1, and +j, multipliers $28_0$ to $28_m$ and multiplier 31 can be implemented merely by exchanging or reversing the sign of the in-phase (I) component and the quadrature (Q) component of each signal applied thereto in accordance with $\alpha j$. Thus, the CDMA receiver of the embodiment has an increased number of multipliers as compared with the prior art CDMA receiver. However, the amount of overall hardware associated with the increased number of multipliers is not significantly increased.

In the present embodiment, it is essential that the ratio of the symbol rate of common pilot signal 101 to the symbol rate of user signals $102_0$ to $102_n$ is equal to 1:N (N is an arbitrary integer) and spreading code $C_p$ used for distinguishing pilot signal 101 from user signals $102_0$ to $102_n$ is not changed for one symbol period of pilot signal 101.

While a preferred embodiment of the present invention has been described using specific terms, such description is for illustrative purposes only, and it is to be understood that changes and variations may be made without departing from the spirit or scope of the following claims.

What is claimed is:

1. A CDMA receiver that receives code division multiplexed signals obtained by spreading a plurality of user signals and one common pilot signal with differing spreading codes, and for recovering a particular user signal among said user signals and said common pilot signal, said CDMA receiver comprising:

a high speed adder that adds a signal obtained by demodulating the received signals to a first accumulated value;

a group of registers including as many first registers as the number of possible values of the spreading code of the particular user signal, wherein each of said group of registers is reset for one symbol period;

a first code generator that repeatedly generates the spreading code corresponding to the particular user signal in sequence;

a first switch that receives a signal from said high speed adder and supplies the signal to one of the first registers corresponding to a value being applied thereto from the first code generator;

a second switch that selects a value stored in the one of the first registers corresponding to the value of the spreading code being applied thereto from said first code generator to output the selected value as the first accumulated value;

as many first multipliers as there are first registers, each first multiplier multiplying a value stored in one of the first registers by a value which is a complex conjugate number of the value of the spreading code associated with the particular user signal that corresponds to the one of the first registers;

a first slow speed adder that adds together signals output from the first multipliers;

a second slow speed adder that adds together the values stored in the first registers;

a second code generator that repeatedly generates the code which is a complex conjugate number of the spreading code corresponding to said common pilot signal; and a second multiplier that multiplies the added value at said second slow speed adder by the value of the code generated at said second code generating means.

2. The CDMA receiver according to claim 1, wherein the received signal is spread using quadrature phase shift keying, and the group of registers includes four first registers.

3. The CDMA receiver according to claim 1, further comprising:

a third slow speed adder for adding an output signal from the second multiplier to a second accumulated value; and a second register for storing an output signal from the third slow speed adder for one chip and then outputting the signal as the second accumulated value.

4. The CDMA receiver according to claim 3, wherein the received signal is spread using quadrature phase shift keying and the group of registers includes four first registers.

5. A CDMA communication system comprising:

a CDMA transmitter that code division multiplexes at least one user signal and one common pilot signal with differing spread codes, and that transmits code division mulitplexed signals; and a CDMA receiver that receives code division multiplexed signals obtained by spreading a plurality of user signals and one common pilot signal with differing spreading codes, and that recovers a particular user signal among the user signals and the common pilot signal, said CDMA receiver comprising:

a high speed adder that adds a signal obtained by demodulating the received signals to a first accumulated value;

a group of registers including as many first registers as the number of possible values of the spreading code of the particular user signal, wherein each of said group of registers is reset for one symbol period;

a first code generator that repeatedly generates the spreading code corresponding to the particular user signal in sequence;

a first switch that receives a signal from said high speed adder and supplies the signal to one of the first registers corresponding to a value being applied thereto from the first code generator;

a second switch that selects a value stored in the one of the first registers corresponding to the value of the spreading code being applied thereto from said first code generator to output the selected value as the first accumulated value;

as many first multipliers as there are first registers, each first multiplier multiplying a value stored in one of the first registers by a value which is a complex conjugate number of the value of the spreading code associated with the particular user signal that corresponds to the one of the first registers;

a first slow speed adder that adds together signals output from the first multipliers;

a second slow speed adder that adds together the values stored in the first registers;

a second code generator that repeatedly generates the code which is a complex conjugate number of the spreading code corresponding to said common pilot signal; and a second multiplier for multiplying the added value at said second slow speed adder by the value of the code generated at said second code generating means.

6. A CDMA communication system comprising:

a CDMA transmitter that code division multiplexes at least one user signal and one common pilot signal with differing spreading codes, and that transmits code division multiplexed signals; and a CDMA receiver that receives code division multiplexed signals obtained by spreading a plurality of user signals and one common pilot signal with differing spreading codes, and that recovers a particular user signal among the user signals and the common pilot signal, said CDMA receiver comprising:

a high speed adder that adds a signal obtained by demodulating the received signals to a first accumulated value;

a group of registers including as many first registers as the number of possible values of the spreading code of the particular user signal, wherein each of said group of registers is reset for one symbol period;

a first code generator that repeatedly generates the spreading code corresponding to the particular user signal in sequence;

a first switch that receives a signal from said high speed adder and supplies the signal to one of the first registers corresponding to a value being applied thereto from the first code generator;

a second switch that selects a value stored in the one of the first registers corresponding to the value of the spreading code being applied thereto from said first code generator to output the selected value as the first accumulated value;

as many first multipliers as there are first registers, each first multiplier multiplying a value stored in one of the first registers by a value which is a complex conjugate number of the value of the spreading code associated with the particular user signal that corresponds to the one of the first registers;

a first slow speed adder that adds together signals output from the first multipliers;

a second slow speed adder that adds together the values stored in the first registers;

a second code generator that repeatedly generates the code which is a complex conjugate number of the spreading code corresponding to said common pilot signal;

a second multiplier that multiplies the added value at the second slow speed adder by the value of the code generated at said second code generating means; and wherein the received signal is spread using quadrature phase shift keying, and the group of registers includes four first registers.

7. A CDMA communication system comprising:

a CDMA transmitter that code division multiplexes at least one user signal and one common pilot signal with differing spreading codes; and that transmits code division multiplexed signals; and a CDMA receiver that receives code division multiplexed signals obtained by spreading a plurality of user signals and one common pilot signal with differing spreading codes, and that recovers a particular user signal among the user signals and the common pilot signal, said CDMA receiver comprising:

a high speed adder that adds a signal obtained by demodulating the received signals to a first accumulated value;

a group of registers including as many first registers as the number of possible values of the spreading code of the particular user signal, wherein each of said group of registers is reset for one symbol period;

a first code generator that repeatedly generates the spreading code corresponding to the particular user signal in sequence;

a first switch that receives a signal from said high speed adder and supplies the signal to one of the first registers corresponding to a value being applied thereto from the first code generator;

a second switch that selects a value stored in the one of the first registers corresponding to the value of the spreading code being applied thereto from said first code generator to output the selected value as the first accumulated value;

as many first multipliers as there are first registers, each first multiplier multiplying a value stored in one of the first registers by a value which is a complex conjugate number of the value of the spreading code associated with the particular user signal that corresponds to the one of the first registers;

a first slow speed adder that adds together signals output from the first multipliers;

a second slow speed adder that adds together the values stored in the first registers;

a second code generator that repeatedly generates the code which is a complex conjugate number of the spreading code corresponding to said common pilot signal;

a second multiplier that multiplies the added value at said second slow speed adder by the value of the code generated at said second code generating means;

a third slow speed adder that adds an output signal from the second multiplier to a second accumulated value; and a second register that stores an output signal from the third slow speed adder for one chip and then outputs the signal as the second accumulated value.

8. A CDMA communication system comprising:

a CDMA transmitter that code division multiplexes at least one user signal and one common pilot signal with differing spreading codes and that transmits code division multiplexed signals; and a CDMA receiver that receives code division multiplexed signals obtained by spreading a plurality of user signals and one common pilot signal with differing spreading codes, and that recovers a particular user signal among the user signals and the common pilot signal, said CDMA receiver comprising:

a high speed adder that adds a signal obtained by demodulating the received signals to a first accumulated value;

a group of registers including as many first registers as the number of possible values of the spreading code of the particular user signal, wherein each of said group of registers is reset for one symbol period;

a first code generator that repeatedly generates the spreading code corresponding to the particular user signal in sequence;

a first switch that receives a signal from said high speed adder and supplies the signal to one of the first registers corresponding to a value being applied thereto from the first code generator;

a second switch that selects a value stored in the one of the first registers corresponding to the value of the spreading code being applied thereto from said first code generator to output the selected value as the first accumulated value;

as many first multipliers as there are first registers, each first multiplier multiplying a value stored in one of the first registers by a value which is a complex conjugate number of the value of the spreading code associated with the particular user signal that corresponds to the one of the first registers;

a first slow speed adder that adds together signals output from the first multipliers;

a second slow speed adder that adds together the values stored in the first registers;

a second code generator that repeatedly generates the code which is a complex conjugate number of the spreading code corresponding to said common pilot signal;

a second multiplier that multiplies the added value at said second slow speed adder by the value of the code generated at said second code generating means;

a third slow speed adder that adds an output signal from the second multiplier to a second accumulated value;

a second register that stores an output signal from the third slow speed adder for one chip and then outputs the signal as the second accumulated value; and wherein the received signal is spread using quadrature phase shift keying and the group of registers includes four first registers.

* * * * *